G. W. DONNING.
CABINET FOR TYPE WRITING MACHINES.
APPLICATION FILED AUG. 21, 1908.
993,588.
Patented May 30, 1911.
6 SHEETS—SHEET 1.
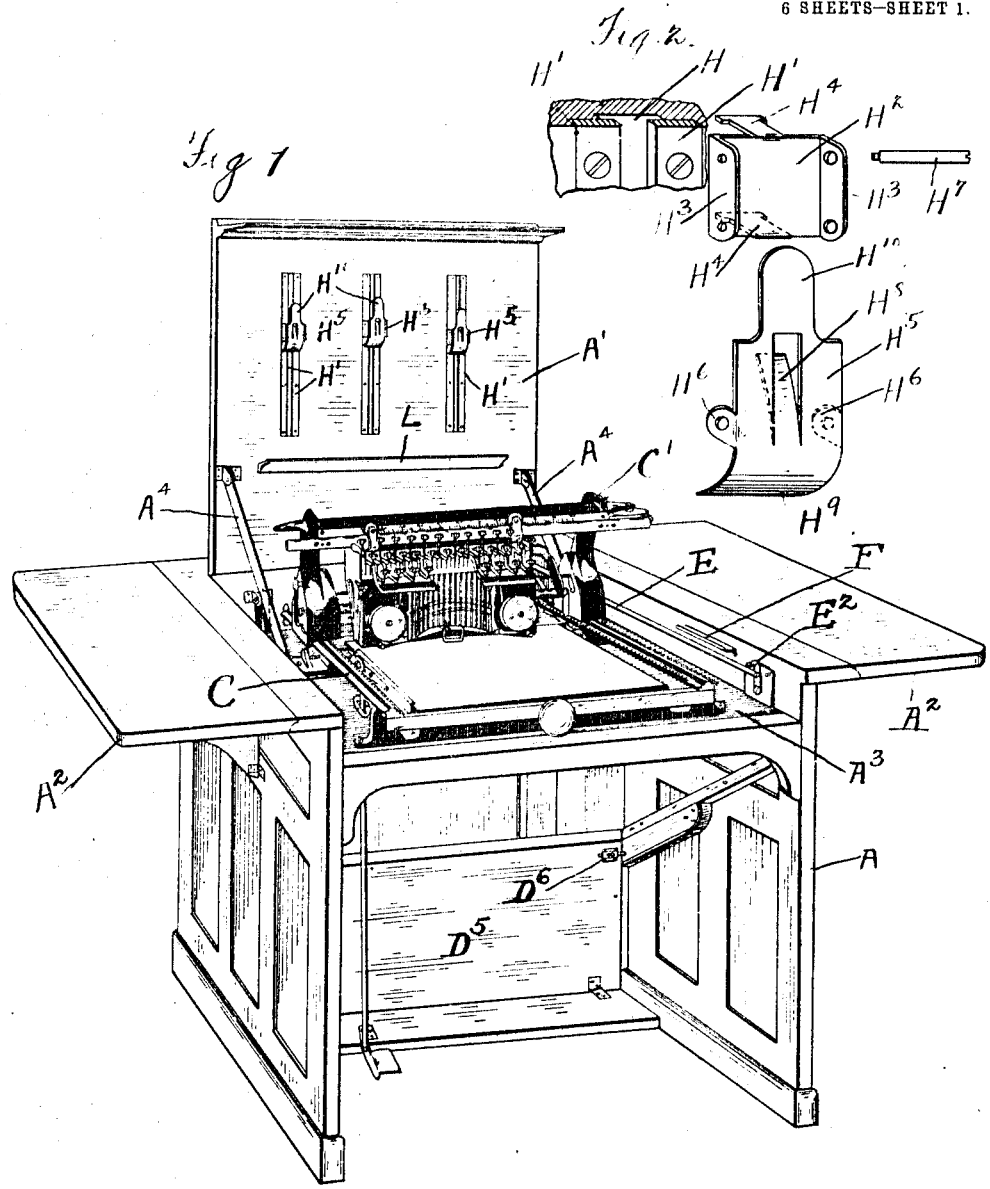
WITNESSES:
Harold E. Stonebraker.
Agnes Dunn
INVENTOR:
George W. Donning
BY
Grenforth & Parry
HIS ATTORNEYS

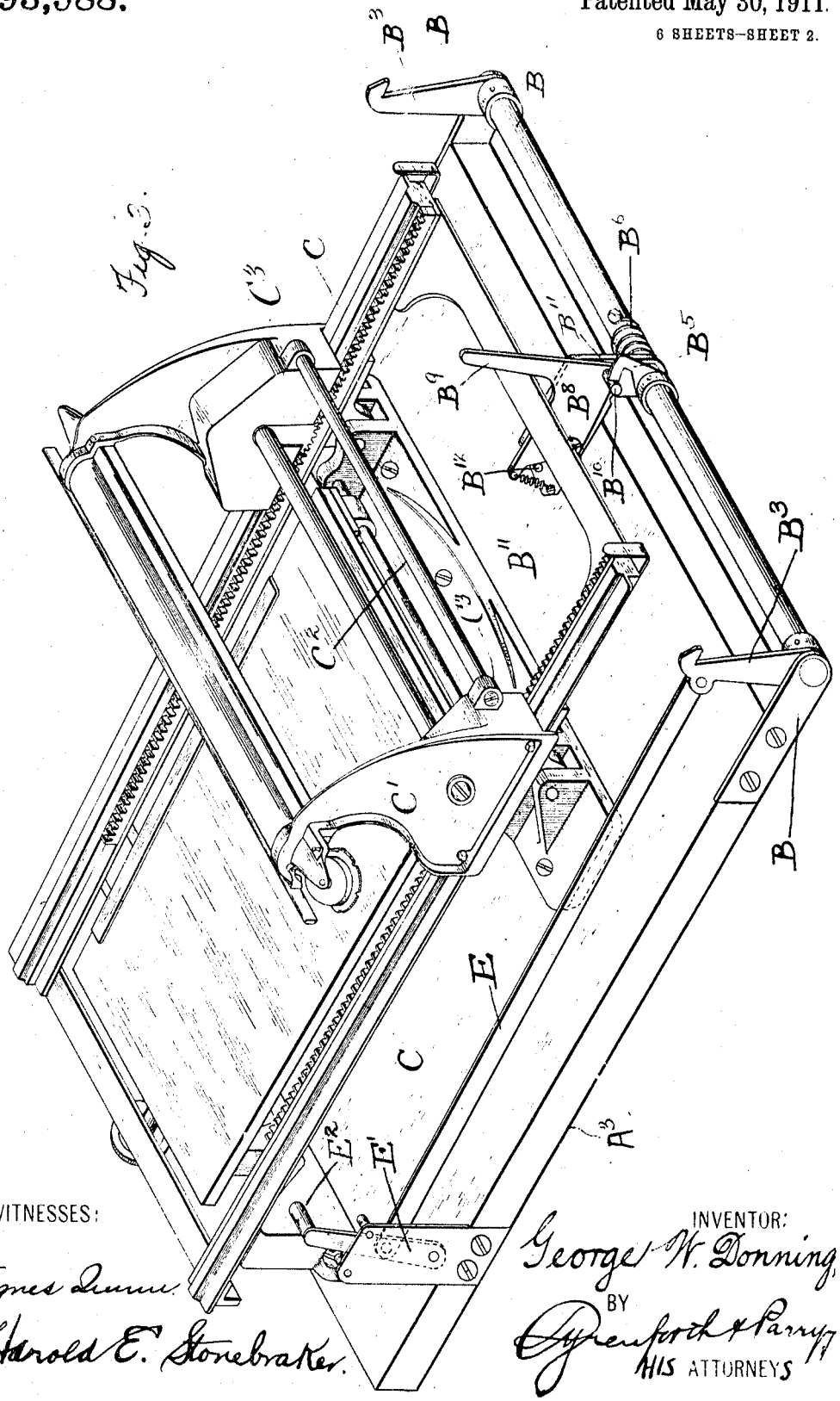

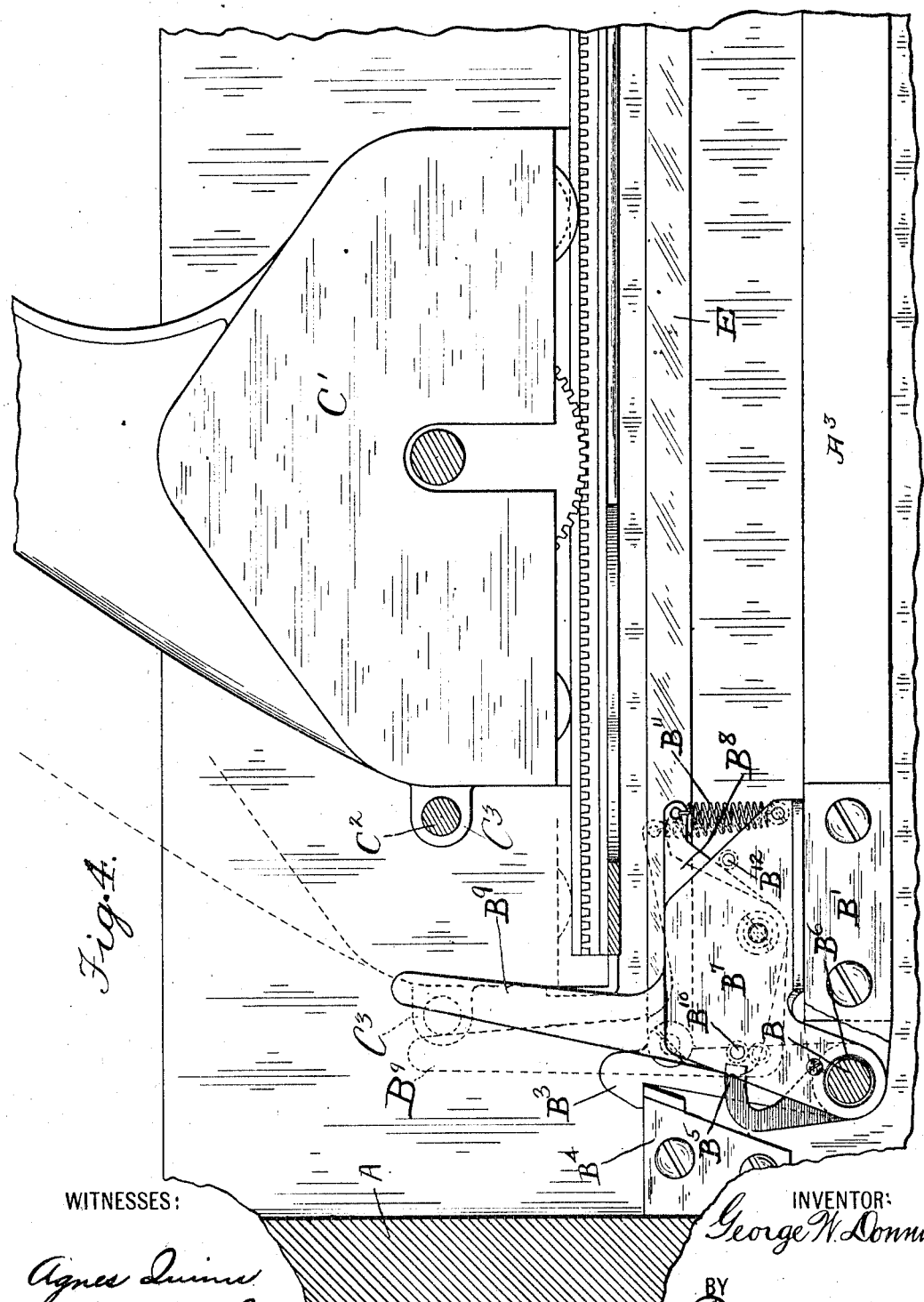

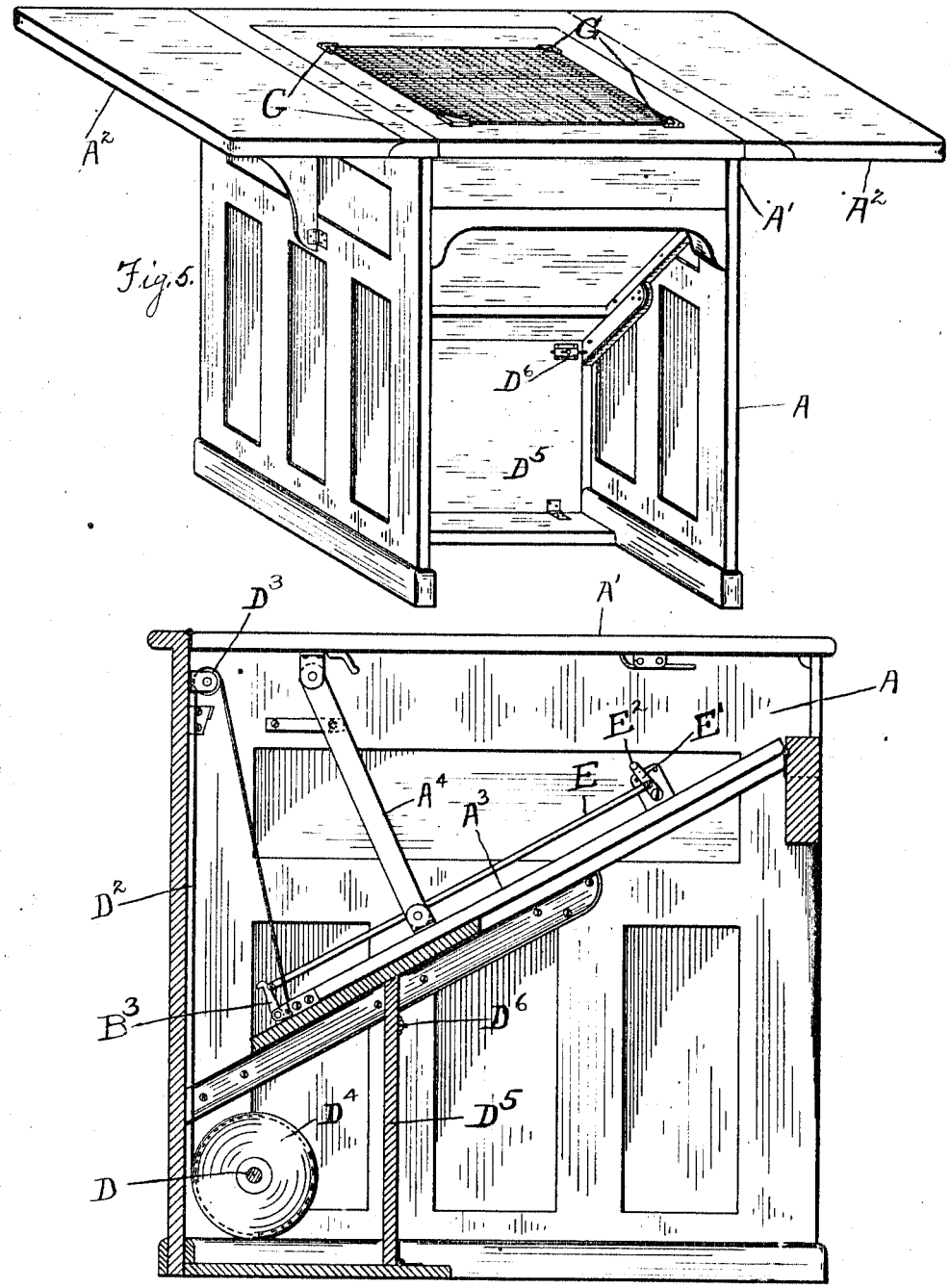

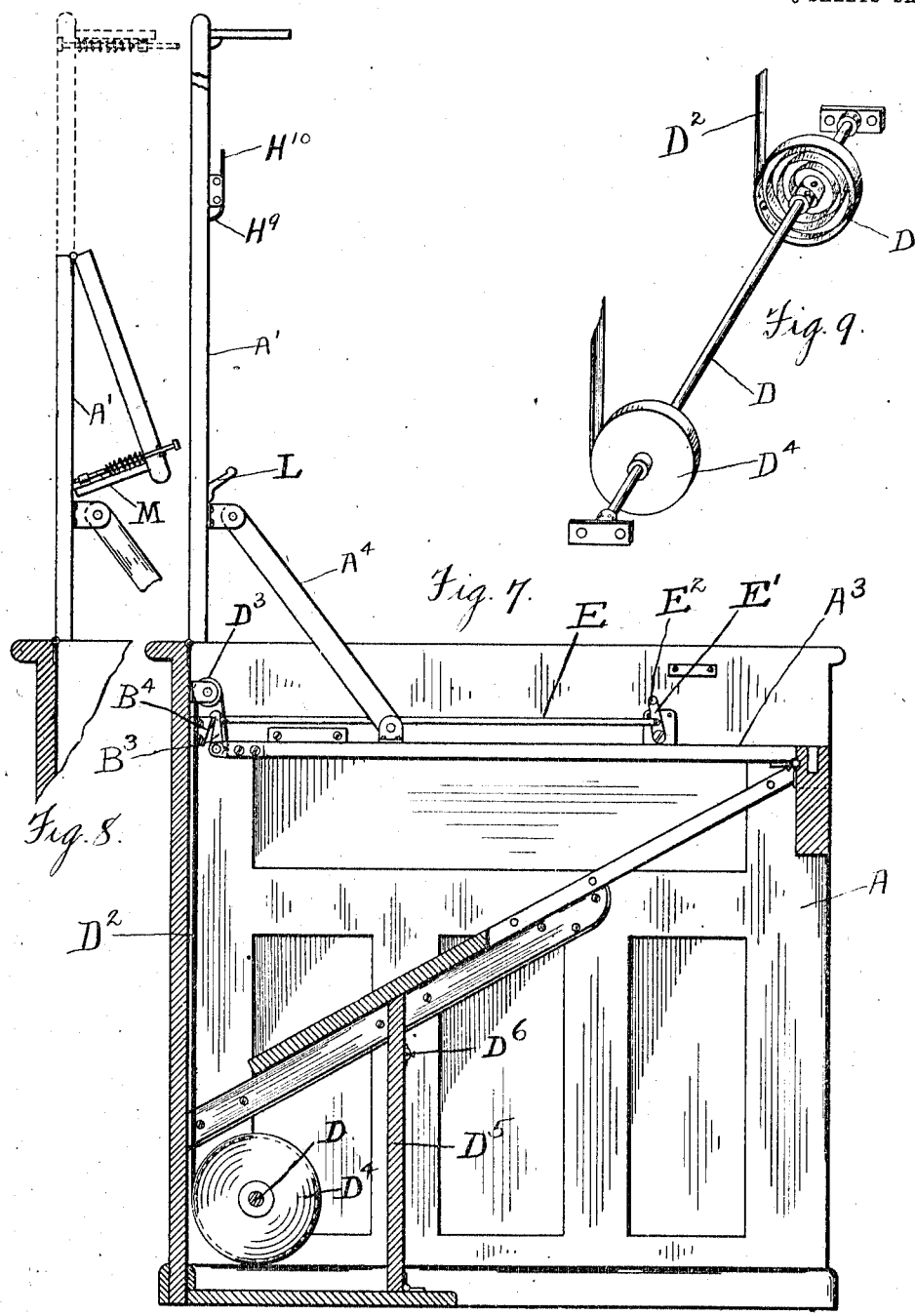

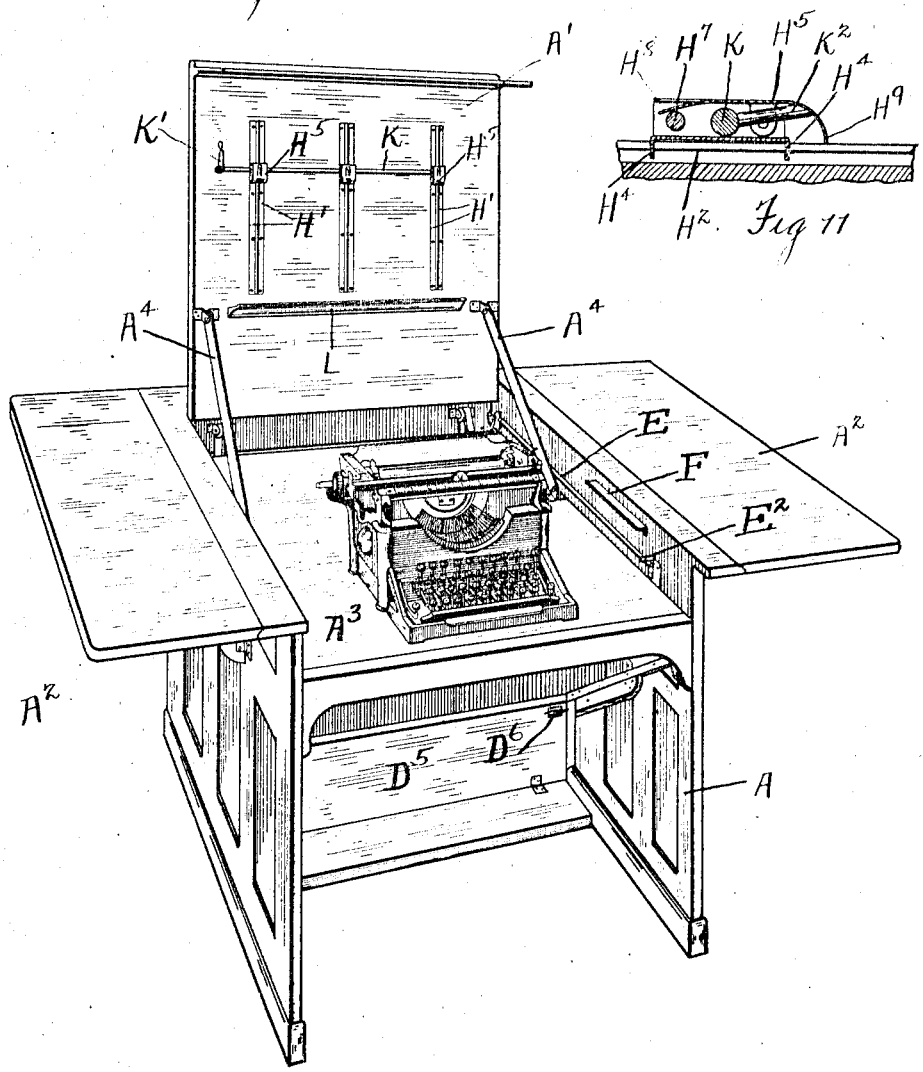

UNITED STATES PATENT OFFICE.

GEORGE W. DONNING, OF NEW YORK, N. Y., ASSIGNOR TO HARRY T. AMBROSE, OF ORANGE, NEW JERSEY.

CABINET FOR TYPE-WRITING MACHINES.

993,588.  Specification of Letters Patent.  Patented May 30, 1911.

Application filed August 21, 1908. Serial No. 449,684.

*To all whom it may concern:*

Be it known that I, GEORGE W. DONNING, a citizen of the United States, residing at New York, in the county of New York and State of New York, have invented certain new and useful Improvements in Cabinets for Type-Writing Machines; and I do hereby declare the following to be a full, clear, and exact description of the invention, such as will enable others skilled in the art to which it appertains to make and use the same.

The invention relates to improvements in cabinets for typewriting machines, and more particularly for use with machines of the flat-platen type, although it is susceptible of use also with machines embodying a round platen.

The present invention is adapted to that type of cabinets in which the typewriter is positioned upon a hinged drop-table adapted to fold down into the lower portion of the cabinet, the lid or cover being connected to the said table and operating to close the top when the machine is lowered into the cabinet, and out of use.

One of the objects of my invention is to provide a means for locking the drop-table in its raised or operative position, there being suitable instrumentalities for releasing the locking means. The purpose of such a construction is to prevent the accidental or unintentional lowering of the typewriter table, by some one leaning upon the same, or otherwise, which is likely to cause damage to the machine, and further, to obviate the lowering of the machine when the parts are not in their proper positions, as for instance, when the carriage is out of position.

A further object of the invention is the provision of automatic devices for permitting release of the locking means, the operation of such automatic devices being dependent on the position of one of the movable elements of the structure, as for instance, the line-spacing carriage of a flat-platen machine, so that the typewriter table is locked in its normal raised position, and cannot be lowered until the line-spacing carriage is moved back to the rear portion of the track-rails, at which time it coöperates to permit the locking means to be released, and permit the typewriter to be lowered.

With these several objects and advantages in view, my improvement includes, in its preferred embodiment, the form of construction hereinafter described in detail, more particularly pointed out in the appended claims, and shown fully in the annexed drawings, in which:

Figure 1 is a perspective view of a cabinet equipped with my improved device. Fig. 2 is a view showing the parts in detail of the copy-holder or support. Fig. 3 is a perspective view of the track-frame, line-spacing carriage, and locking means; also, showing the coöperation between the locking means and the line-spacing carriage. Fig. 4 is a side elevation of the parts shown in Fig. 3. Fig. 5 is a perspective view showing the cabinet closed. Fig. 6 is a sectional view taken vertically through the cabinet, the cover being closed. Fig. 7 is a view similar to Fig. 6, with the cover raised. Fig. 8 is a detail view of the cover showing a modified form of copy-holder. Fig. 9 is a perspective view of the counter-balance shaft and the tensioning spring attached thereto. Fig. 10 is a perspective view of the cabinet in open position and adapted for a round-platen machine. Fig. 11 is a detail sectional view of the copy-holder.

Referring more specifically to the drawings, wherein like reference characters refer to corresponding parts in the several views, A designates a cabinet of the usual form, which is provided with the cover $A'$ and the side leaves $A^2$.

$A^3$ is the typewriter drop-table, connected to the cover $A'$ by the links $A^4$.

B is a shaft which is journaled in the brackets $B'$ secured to the table $A^3$. Fastened to the shaft B at both ends are the locking catches $B^3$, adapted to engage the lugs $B^4$ secured to the cabinet frame, as shown clearly in Fig. 4. Also fast on the shaft B is a collar which carries the angle-lever $B^5$ for a purpose presently to be described.

$B^6$ is a spring, one end of which is secured to the shaft B, the other end being attached to the stationary plate $B^7$, carried by the table $A^3$, the tendency of the spring being to turn the shaft B in a direction to hold the catches $B^3$ in engagement with lugs $B^4$. Pivoted to the plate $B^7$ is an arm $B^8$ having an upward projecting finger $B^9$, and carrying a pin $B^{10}$, normally lying in the path of angle-lever $B^5$.

$B^{11}$ is a spring attached to the plate $B^7$ and connected to arm $B^9$, thereby serving to hold said arm normally against the stop-pin $B^{12}$.

C represents the track-rails and C' the line-spacing carriage of the usual form of Donning flat-platen machine.

$C^2$ is a bar secured to the rear of the line-spacing carriage by means of the lugs $C^3$, and adapted to engage the finger $B^9$, when the carriage is moved to the rear of the track-rails. In the normal position, or that shown in Figs. 3 and 4, with the carriage at the front part of the track-rails, the arm $B^8$ is in its forward position, causing pin $B^{10}$ to lie in the path of angle-lever $B^5$ and prevent the forward movement thereof. The shaft B is held against forward rotation by the positioning of angle-lever $B^5$ against the pin $B^{10}$, and by spring $B^6$, and hence the locking-catches $B^3$ are in engagement with the lugs $B^4$, whereby lowering of the table $A^3$ is prevented. As soon as the carriage C', however, moves rearwardly far enough, the bar $C^2$ engages the finger $B^9$ and rocks the arm $B^8$ rearward, which moves the pin $B^{10}$ downward and out of the path of angle-lever $B^5$. The handle $E^2$ may then be operated whereby the shaft B is turned, and the locking-catches $B^3$ are moved forwardly out of engagement with the lugs $B^4$. The table $A^3$ is then free to be lowered into the cabinet, into the position shown in Figs. 6 and 7.

Disposed in the bottom of the cabinet is a normally non-rotatable transverse supporting-rod or shaft D. A spring D' has one end attached to this shaft and its other end secured to the inner peripheral wall of a revoluble drum or casing $D^4$ encircling the shaft. Winding upon the outer periphery of the drum is a band $D^2$ which connects at its other end to the table-top $A^3$, and is supported intermediate of its ends upon a pulley $D^3$. When the table-top is lowered from its raised position (Fig. 7) to its lowermost position (Fig. 6), the upper end of the band will be drawn downward, and the upward pull on the other portion of the band causes it to unwind from the drum and rotate this drum, clockwise, on the shaft, and tension the spring contained therein and which is connected to the stationary shaft. Then, when the table-top is to be raised, the structure thus described will, by reason of the tension on the spring, tend to counterbalance or over-balance the weight of the table-top and its supported parts, so that it can be moved with facility.

$D^5$ is a hinged panel adapted to be held in place by the spring-latches $D^6$, in order to permit access to the lower part of the cabinet.

In another aspect, the automatic means is omitted, and manually-operated devices retained, as shown in Fig. 10. To this end, I attach a rod E to one of the catches $B^3$, and connect this rod to a pivoted lever E', as shown in Figs. 7 and 10. Carried by the lever E' is a handle $E^2$ for operating the same. By moving the handle forwardly, the lever E' is rocked, pulling the rod E in the same direction, and moving the catches $B^3$ out of engagement with the lugs $B^4$. As the table $A^3$ is lowered, the connecting links $A^4$ serve to also lower the cover A', and close the top of the cabinet. I frequently employ the hand operated attachment with the round-platen machine, although, of course, I may by slight changes, adapt the automatically operated construction to the round-platen machines, and I desire this to be included within the scope of my invention. Herein I have illustrated the structure as including a line-spacing carriage of a flat platen typewriter, which carriage is adapted to be moved back and forth on the track C. This line-spacing carriage is a horizontally shiftable, as well as a horizontally traveling, means or member for operating parts of the structure to effect a release of the locking means. This carriage, as herein contemplated, is a "machine", wherefor, when I herein refer to "horizontally traveling means" "horizontally shiftable member", "traveling means", "traveling member", "machine-operated", and expressions of like import, I intend to be understood as referring to the line-space carriage of the structure, or, in instances where there is no line-space carriage, but, instead, a typewriting machine which is shiftable back and forth is disclosed, these expressions would refer to such machine; or, if the machine is not shiftable, but a shiftable element thereof or operating in connection therewith is employed for performing the function described, then the applicable expressions referred to would have reference to such an arrangement of parts.

F designates a pencil tray, and G are clips secured to the cover for supporting a pad or blotter, these being parts generally employed with a cabinet of this character, and constituting no part of my invention.

I will now describe the copy-holder or support, of which mention has previously been made in the foregoing description. H designates grooves in the under face of the cover A', and H' are plates secured to the cover and overlying a portion of the grooves (see Fig. 2). $H^2$ is the clip-supporting member, provided with the ears $H^3$ and the downward extending inverted T-shaped lugs $H^4$ which engage in the groove H, underlying the plates H'. $H^5$ is the clip or holder, which is pivoted to the ears $H^3$ by the ears $H^6$ being held in place by a pin $H^7$. $H^8$ is a spring struck out from the clip and serving to hold the engaging portion $H^9$ down against the paper. $H^{10}$ is the handpiece for raising the clip. Generally, there are three or more of these clips employed on the cover, and I may, in some instances use a common releasing means for all of them, as shown in Fig. 10. This consists of a shaft K, having a hand-operating lever K', and underlying each of the clips. To the shaft is secured an arm K², adapted to engage the clip and lift the same whenever the shaft is turned, thus releasing the sheet simultaneously at all points. L is a shelf for supporting the lower end of the sheet.

Sometimes, the cover is of such length, that it is preferable to form it in two parts, hinged together, as shown in Fig. 8. In such a form of construction, I omit the shelf L, and use in lieu thereof, a plurality of spring plungers M which, when the upper section of the cover is thrown down, abut the remaining part of the cover, and are forced out to constitute a support for the lower edge of the copy. Under some conditions, I may so connect the parts that the writing mechanism unlocks the table, instead of merely releasing the controlling device, and thus the cover may be operated without the employment of any manual means.

Although I have shown the invention in a particular embodiment, this is only a preferred form and is intended to illustrate merely one application of the idea involved. It is to be understood that I may change the present structure, as warranted by circumstances, in various particulars, and not in any way depart from the spirit or scope of the invention as herein set forth.

What I claim as new, and desire to secure by Letters-Patent, is:—

1. In a cabinet, a machine-supporting drop-table therein, a typewriting-machine sustained thereby, locking mechanism for retaining said table in raised position, and shiftable lock-releasing means including said typewriting machine for actuating said locking-mechanism when said shiftable means is positioned in engagement with said mechanism.

2. In a typewriter cabinet, a drop-table therein, a typewriting machine movably mounted on said table to shift horizontally thereon, means for locking the table in raised position, and instrumentalities operated by, and during the travel of, the typewriter for releasing said locking means.

3. In a typewriter cabinet, the combination with a typewriting-machine, of a drop-table for supporting the same, means for locking the table in raised position, and instrumentalities connected to a movable element of said typewriter for releasing the locking means.

4. In a cabinet, the combination with a typewriting-machine, a movable carriage included thereby, a drop-table for supporting the typewriter, means for locking the table in raised position, and instrumentalities controlled by said movable carriage for releasing the locking means.

5. In a cabinet, the combination with a typewriting-machine, including a line-space carriage, a drop-table for supporting said typewriting-machine, means for locking the table in raised position, and instrumentalities controlled by said line-space carriage for releasing the locking means.

6. In a cabinet, the combination with a typewriting-machine, including track-rails and a carriage movable thereover for line spacing, a drop-table for supporting said machine, means for locking the table in raised position, and instrumentalities controlled by said carriage during its travel upon said track-rails for releasing the locking means.

7. In a cabinet, the combination with a typewriting-machine, including track-rails and a carriage movable thereover for line spacing, a drop-table for supporting said machine, means for locking the table in raised position and instrumentalities for releasing the locking means when the line-space carriage reaches the rear portion of said track-rails.

8. In a cabinet, the combination with a typewriting-machine including a line-space carriage, a drop-table for supporting said machine, means for locking the table in raised position, and instrumentalities for releasing the locking means at the limit of the rearward movement of the line-space carriage.

9. In a cabinet, the combination with a shiftable typewriting-machine, of a drop-table for supporting said machine, lugs carried by the cabinet, locking-catches mounted on the drop-table for engagement with said lugs, and actuating means released by contact therewith of said shiftable machine for moving said catches out of engagement with the lugs.

10. In a cabinet, the combination with a typewriting-machine including a carriage, a drop-table for supporting said machine, lugs carried by the cabinet, locking-catches mounted on said drop-table and adapted to engage with the aforementioned lugs, actuating means arranged in the path of movement of said carriage and adapted to be released thereby, and means for moving said catches out of engagement with said lugs.

11. In a cabinet, the combination with a typewriting-machine including a line-space carriage, a drop-table for supporting said machine, lugs carried by the cabinet, a shaft mounted on the table, locking-catches carried by said shaft and adapted to engage the aforementioned lugs, and means controlled by said line-space carriage for moving the catches out of engagement with the lugs.

12. In a cabinet, the combination with a typewriting-machine including a carriage, a drop-table for supporting said machine, lugs carried by the cabinet, locking-catches mounted adjacent the rear portion of said drop-table and adapted for engagement with said lugs, a catch-actuating device arranged in the path of movement of said carriage and adapted to be shifted thereby, and manually-controlled means for disengaging said catches from said lugs.

13. In a cabinet, the combination with a typewriting-machine including a carriage, a drop-table for supporting said machine, lugs carried by the cabinet, a shaft mounted on said drop-table and in the path of movement of said carriage for co-action therewith, locking-catches carried by said shaft for engagement with the aforementioned lugs, means operated by the co-action of said carriage and shaft for releasing said catches, and means for moving the latter out of engagement with the lugs.

14. In a cabinet, the combination with a machine-member and a drop-table for supporting said machine-member, of means for locking said drop-table in its raised position, mechanism actuated by movement of said machine-member for releasing said locking-means, and manually-controlled devices for actuating said locking-means when released.

15. In a cabinet, the combination with a typewriting-machine including a carriage, a drop-table for supporting said machine, lugs carried by the cabinet, a shaft mounted on the drop-table and with which said carriage is adapted to co-act, locking-catches carried by said shaft and adapted to engage with said lugs, means for retaining said catches and lugs in engagement and adapted to be released by the co-action of said carriage and shaft, and a hand-controlled device adapted to disengage said catches from the lugs when said retaining means is released.

16. In a cabinet, the combination with a typewriting-machine including a line-space carriage, a drop-table for supporting the machine, lugs carried by the cabinet, a shaft mounted on said drop-table, locking-catches carried by said shaft for engagement with the aforementioned lugs, means for normally locking the shaft against movement in one direction, and instrumentalities controlled by the line-space carriage for releasing said locking means.

17. In a cabinet, the combination with a typewriting-machine including a line-space carriage, a drop-table for supporting said machine, lugs carried by the cabinet, a shaft mounted on the drop-table, locking-catches carried by said shaft for engagement with the aforementioned lugs, an angle-lever fixedly mounted on said shaft, an abutment normally engaging said angle-lever and means controlled by the line-space carriage for moving said abutment out of engaging position.

18. In a cabinet, the combination with a typewriting-machine including a line-space carriage, a drop-table for supporting said machine, lugs carried by the cabinet, a shaft mounted on the drop-table, locking-catches carried by the shaft for engagement with the aforementioned lugs, an angle-lever fixedly mounted on the shaft, a plate pivoted upon said table and provided with an abutment normally in engagement with said angle-lever, and means including a traveling part of said line-space carriage for removing said plate out of normal position.

19. In a cabinet, the combination with a typewriting-machine including a line-space carriage, a drop-table for supporting said machine, lugs carried by the cabinet, a shaft mounted on the table, locking-catches carried by said shaft for engagement with the aforementioned lugs, an angle-lever fixedly mounted on said shaft, a bar mounted upon the line-space carriage, a plate pivotally secured to said table and provided with an abutment normally in engagement with the aforementioned angle-lever, and a finger projecting from said plate and lying in the path of the aforementioned bar whereby to move the plate out of normal position.

20. In a cabinet, the combination with a typewriting-machine, of a drop-table for supporting the same, an automatically operating lock for locking the table in raised position, a lock-controlling element adapted to be engaged and actuated by said typewriting-machine, and means for unlocking said drop-table.

21. In a cabinet, the combination with a typewriting machine comprising a shiftable member, of a drop-table for supporting the same, means for locking the table in raised position, and means actuated by said shiftable member of the machine for releasing said locking-means.

22. In a cabinet, the combination with a typewriting machine comprising a shiftable member, of a drop-table for supporting the machine, automatic means for locking the table in raised position, and means controlled by said shiftable member of the machine for releasing said locking means.

23. In a cabinet, the combination with a typewriting-machine including a shiftable member, a drop-table for supporting the same, means for locking the table in raised position, co-acting means in the path of movement of said shiftable member for releasing said locking means, and means for actuating said locking-means.

24. In a cabinet, the combination with a movable drop-table, means for locking the table in raised position, a typewriting-machine sustained by said drop-table, and means co-acting with said locking means and controlled by the position of said typewriting-machine for releasing the same.

25. In a cabinet, the combination with a drop-table adapted to occupy a plurality of positions, means for locking the same in one of its positions, a shiftable typewriting-machine-element sustained by said drop-table, and means co-acting with said element and adapted to be actuated thereby when shifted in either direction relatively thereto to control said table-locking means.

26. In a typewriter-cabinet, a typewriting-machine unit comprising a typewriting-machine and a drop-table for supporting the same, and automatic means for locking said table in raised position, said automatic means being actuated by a movement of the machine member of the machine-unit.

27. In a typewriter-cabinet, a typewriting-machine unit comprising a typewriting machine and a drop-table for supporting the same, automatic means for locking said table in raised position, said automatic means being actuated by a movement of the machine-member of the machine-unit, and means for unlocking said drop-table.

28. In a typewriter-cabinet, the combination including the following elements: a typewriting-machine, a drop-table, and a movable supporting member arranged in juxtaposition thereto, and means for locking said table in raised position and adapted to be released by the coöperating movement therewith of one of said elements.

29. In a cabinet, the combination with a typewriting-machine including a slidable member connecting therewith, a drop-table for supporting the same, a controlling device with which said slidable-member co-acts, locking-means connecting with said controlling-device and adapted to be released when said member co-acts with said controlling-device, and locking-means to release the drop-table.

30. In a cabinet, the combination with a drop-table for supporting a machine, automatically-operated means for locking the table in raised position, a machine supported on said drop-table and having an actuating engagement with said locking means, and mechanism co-acting with said locking means for controlling its operation.

31. In a cabinet, the combination with a machine-supporting drop-table, of mechanism for locking the table in raised position, actuating means for said locking mechanism, and a typewriter machine which includes a shiftable member adapted to be positioned in engagement with said actuating means for automatically releasing said locking means.

32. In a typewriter-cabinet, a drop-table, means for locking the same in raised position including lugs mounted on said cabinet and catches adapted to engage therewith, a controlling-shaft upon which said catches are mounted, an angle-lever fast on said shaft, a plate arranged in juxtaposition thereto, a lever pivoted on said plate and adapted to control the movement of said angle-lever, a spring encircling said shaft, means for actuating said pivoted lever, and means for actuating said catches out of engagement with lugs.

33. In a cabinet, a machine-supporting drop-table therein, a typewriting-machine sustained thereby, locking mechanism for retaining said table in raised position, shiftable lock-releasing means including said typewriting-machine for actuating said locking-mechanism when said shiftable means is positioned in engagement with said mechanism, and means for counterbalancing said drop-table and the parts supported thereby when released.

34. In a cabinet, the combination with a machine-member and a drop-table for supporting said machine-member, of means for locking said drop-table in its raised position, mechanism actuated by movement of said machine-member for releasing said locking-means, manually-controlled devices for actuating said locking-means when released, and means for counterbalancing said drop-table when released.

35. In a typewriter-cabinet, a typewriting-machine unit including the following elements, namely, a typewriting-machine and a drop-table for supporting the same, automatic means for locking said table in raised position, said automatic means being actuated by a movement of the first-mentioned of said elements of the machine-unit, and means operatively connecting with said drop-table for counterpoising it.

36. In a typewriter-cabinet, a typewriting-machine unit including the following elements, namely, a typewriting-machine and a drop-table for supporting the same, automatic means for locking said table in raised position, said automatic means being actuated by a movement of the first-mentioned of said elements of the machine-unit, means operatively connecting with said drop-table for counterpoising it, and comprising a rotary member, a tension device connecting therewith and tending to actuate it in one direction, and a connection between said rotary member and said drop-table.

In testimony whereof, I affix my signature, in the presence of two subscribing witnesses.

GEORGE W. DONNING.

Witnesses:
CHAS. P. BATT,
W. L. BILLMYER.